US009698681B2

United States Patent
Unno et al.

(10) Patent No.: US 9,698,681 B2
(45) Date of Patent: Jul. 4, 2017

(54) CIRCUIT AND METHOD FOR MAXIMUM DUTY CYCLE LIMITATION IN STEP UP CONVERTERS

(71) Applicant: Dialog Semiconductor (UK) Limited, London (GB)

(72) Inventors: Naoyuki Unno, Kanagawa (JP); Kemal Ozanoglu, Istanbul (TR); Pier Cavallini, Swindon (GB); Louis de Marco, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 55 days.

(21) Appl. No.: 14/870,133

(22) Filed: Sep. 30, 2015

(65) Prior Publication Data

US 2017/0093278 A1    Mar. 30, 2017

(51) Int. Cl.
*H02M 3/156*    (2006.01)
*H02M 3/142*    (2006.01)
(Continued)

(52) U.S. Cl.
CPC ............ *H02M 3/156* (2013.01); *H02M 3/137* (2013.01); *H02M 3/142* (2013.01); *H02M 3/155* (2013.01); *H02M 3/158* (2013.01)

(58) Field of Classification Search
CPC ........ H02M 3/10; H02M 3/137; H02M 3/142; H02M 3/155; H02M 3/156; H02M 3/158; H02M 3/1582
See application file for complete search history.

(56) References Cited

U.S. PATENT DOCUMENTS

| 4,245,286 A | 1/1981 | Paulkovich et al. |
| 4,578,630 A | 3/1986 | Grosch |

(Continued)

FOREIGN PATENT DOCUMENTS

| EP | 1 524 568 | 4/2005 |
| EP | 1524568 | 4/2005 |

OTHER PUBLICATIONS

German Search Report, File No. 10 2015 221 414.1, Applicant: Dialog Semiconductor (UK) Limited, Mail Date: Apr. 6, 2016, 6 pgs, and English Language Translation, 7 pgs.

(Continued)

*Primary Examiner* — Jue Zhang
*Assistant Examiner* — Lakaisha Jackson
(74) *Attorney, Agent, or Firm* — Saile Ackerman LLC; Stephen B. Ackerman; Billy Knowles

(57) ABSTRACT

An adaptive duty cycle limiting circuit is used with a switching DC-to-DC converter for preventing the duty cycle entering a region of operation having negative gain. The adaptive duty cycle limiting circuit includes a duty cycle ramp signal generator, a voltage source for providing a voltage having a fractional value of an input voltage source, and a comparator that compares the duty cycle ramp signal with the fractional value of the input voltage source. When the voltage level of the duty cycle ramp signal is less than the fractional value of the voltage source, a cycle limit signal is activated and communicated to a switching control circuit to adjust the duty cycle of the switching DC-to-DC converter to prevent the duty cycle entering the region of operation where the gain of the switching DC-to-DC converter becomes negative.

38 Claims, 11 Drawing Sheets

(51) Int. Cl.
*H02M 3/158* (2006.01)
*H02M 3/137* (2006.01)
*H02M 3/155* (2006.01)

(56) References Cited

U.S. PATENT DOCUMENTS

| | | | |
|---|---|---|---|
| 6,011,382 A * | 1/2000 | Littlefield | H02M 1/44 |
| | | | 323/222 |
| 6,979,988 B2 | 12/2005 | Sutardja et al. | |
| 7,081,740 B2 | 7/2006 | King | |
| 7,098,641 B2 | 8/2006 | King | |
| 7,768,245 B1 | 8/2010 | De Cremoux | |
| 7,778,046 B1 | 8/2010 | Cuk et al. | |
| 7,884,586 B2 | 2/2011 | Fabbro | |
| 2004/0145927 A1 * | 7/2004 | Haase | H02M 3/156 |
| | | | 363/62 |
| 2008/0030182 A1 | 2/2008 | Sutardja et al. | |
| 2011/0121653 A1 | 5/2011 | Hartular et al. | |
| 2012/0105030 A1 * | 5/2012 | Chen | H02M 3/156 |
| | | | 323/271 |
| 2012/0206121 A1 * | 8/2012 | Evans | H02M 3/156 |
| | | | 323/288 |
| 2013/0193941 A1 | 8/2013 | DeFazio | |
| 2014/0002037 A1 | 1/2014 | Babazadeh et al. | |
| 2014/0266112 A1 * | 9/2014 | Cheng | H02M 3/156 |
| | | | 323/282 |
| 2014/0327423 A1 * | 11/2014 | Lee | H02M 3/156 |
| | | | 323/288 |
| 2015/0077083 A1 * | 3/2015 | Chen | H02M 3/156 |
| | | | 323/288 |

OTHER PUBLICATIONS

"Parasitics and Voltage Collapse of the DC-DC Boost Converter," by H. Mahmood et al., Canadian Conference on Electrical and Computer Engineering, CCECE 2008, May 4-7, 2008, pp. 000273-000278.

Co-pending U.S. Pat. No. DS14-020, U.S. Appl. No. 14/730,705, filed Jun. 4, 2015, "Circuit and Method for Maximum Duty Cycle Limitation in Switching Converters," by Kemal Ozanoglu et al., 34 pgs.

Advanced Engineering Course on Power Management, MEAD Education S.A., EPFL Premises, Lausanne, Switzerland, Aug. 26-30, 2013, DC-DC Converter, Topologies, and Control Techniques, Converter Modeling and Feedback Loop Design, 17 pgs.

* cited by examiner

CIRCUIT AND METHOD FOR MAXIMUM DUTY CYCLE LIMITATION IN STEP UP CONVERTERS

RELATED PATENT APPLICATIONS

U.S. patent application Ser. No. 14/730,705, filed on Jun. 4, 2015, assigned to the same assignee as the present invention, and incorporated herein by reference in its entirety.

TECHNICAL FIELD

This disclosure relates generally to switching DC-to-DC power converters. More particularly, this disclosure relates to circuits and methods for duty cycle control in step-up switching DC-to-DC power converters such as boost and buck-boost switching DC-to-DC power converters.

BACKGROUND

As is known in the art, switching DC-to-DC converters are used to change one DC voltage to another efficiently. There are three basic topologies of switching DC-to-DC converters: step-down (buck), step-up (boost), and step-down/step-up (buck-boost). The buck converter is used to generate a lower dc output voltage, the boost converter is used to generate a higher dc output voltage, and the buck/boost converter is used to generate an output voltage less than, greater than, or equal to the input voltage.

FIG. 1 is schematic of a boost switching DC-to-DC converter of the prior art. The boost switching DC-to-DC converter has an inductor L with a first terminal connected to a first terminal of an input voltage source $V_{in}$. A second terminal of the input voltage source $V_{in}$ is connected to a ground reference voltage source as a return current path. The total associated parasitic resistances $R_W$ of the boost switching DC-to-DC converter is shown as a series resistance with the inductor L. The first terminal of the parasitic resistances $R_W$ is connected to a second terminal of the inductor L. The second terminal of the parasitic resistances $R_W$ is connected to a first terminal of a switch SW and the anode of a diode D. The cathode of the diode D is connected to a first terminal of a filter capacitor C and a first terminal of a load resistance $R_{LOAD}$. The cathode of the diode D, the first terminal of a filter capacitor C, and the first terminal of a load resistance $R_{LOAD}$ form the output terminal OUT of the boost switching DC-to-DC converter. The second terminal of the filter capacitor CL and the second terminal of the load resistor $R_{LOAD}$ are connected to the ground reference voltage source. A duty cycle control signal DC is applied to the control terminal of the switch SW.

The operation of the boost switching DC-to-DC converter begins with the activation of the input voltage source V. The inductor current IL flows through the inductor L, the parasitic resistances $R_W$, the diode D and the load resistance RL. A portion of the inductor current IL charges the capacitor CL. The switch SW is activated by the control signal DC and the diode D is inversely polarized and non-conducting. Consequently, there is no connection between the input voltage source $V_{in}$ and the load resistance RL and thus the voltage across the load resistance RL is developed by the charge of the capacitor CL. When the switch SW is deactivated, the diode D is polarized to be conducting to allow current to flow from the input voltage source $V_{in}$ to the load resistance RL.

Employing Kirchhoff's voltage and current laws, the output voltage of the boost converter $V_{OUT}$ at the output terminal can be calculated by the equations:

$$V_{OUT} = \frac{1}{1-DC} V_{IN}$$

Where
$V_{OUT}$ is the voltage at the output terminal OUT.
DC is the duty cycle of the control signal DC.
$V_{in}$ is the voltage of the input voltage source.

FIG. 2 is schematic of a buck-boost switching DC-to-DC converter of the prior art. The buck-boost switching DC-to-DC converter is capable of scaling the output voltage down with relation to the input voltage or amplifying the output voltage with relation to the input voltage. A buck-boost switching DC-to-DC converter may either invert the output voltage from the input voltage or be non-inverting with the output voltage having the same polarity as the input voltage. The buck-boost switching DC-to-DC converter of FIG. 2 is a non-inverting switching DC-to-DC converter.

The positive terminal of the input voltage source $V_{in}$ is connected to the source of the switching PMOS transistor $M_1$. The negative terminal of the input voltage source $V_{in}$ is connected to the ground reference voltage source. The drain of the switching PMOS transistor $M_1$ is connected to the first terminal of the inductor L and the drain of the switching NMOS transistor $M_2$. The gate of the switching PMOS transistor $M_1$ is connected to the control signal $\phi_1$ and the gate of the switching NMOS transistor $M_2$ is connected to the control signal $\phi_2$. The source of the NMOS transistor $M_2$ is connected to the ground reference voltage source.

The second terminal of the inductor L is connected to the drains of the NMOS transistor $M_3$ and the PMOS transistor $M_4$. The source of the NMOS transistor $M_3$ is connected to the ground reference voltage source. The source of the PMOS transistor $M_4$ is connected to the first terminal of the filter capacitor CL and first terminal of the load resistor $R_{LOAD}$. The gate of the NMOS transistor $M_3$ is connected to the control signal $\phi_3$ and the gate of the PMOS transistor $M_4$ is connected to the control signal $\phi_4$. The source of the PMOS transistor $M_4$, the first terminal of the filter capacitor CL and the first terminal of the load resistor $R_{LOAD}$ form the output terminal OUT of the buck-boost switching DC-to-DC converter. The second terminal of the filter capacitor CL and the second terminal of the load resistor $R_{LOAD}$ are connected to the ground reference voltage source, again.

The PMOS transistor $M_1$ and the NMOS transistor $M_3$ simultaneously turn on and the NMOS transistor $M_2$ and the PMOS transistor $M_4$ turn off. The input voltage source $V_{in}$ is applied across the inductor L. The inductor current IL increases linearly and the filter capacitor CL provides power to the load resistor $R_{LOAD}$. When PMOS transistor $M_1$ and the NMOS transistor $M_3$ turn off and the NMOS transistor $M_2$ and the PMOS transistor $M_4$ turn on, the inductor current IL flows through the NMOS transistor $M_2$ and the PMOS transistor $M_4$ to deliver its stored energy to the output terminal OUT. The NMOS transistor $M_2$ and the PMOS transistor $M_4$ turn off, and their body diodes turn on until the control PMOS transistor $M_1$ and the NMOS transistor $M_3$ turn on.

Assuming no power loss in the components of the buck-boost switching DC-to-DC converter, the voltage gain with this control scheme under continuous current mode operation is given by the equation:

$$V_{OUT} = \frac{DC}{1-DC} V_{IN}$$

Where
$V_{OUT}$ is the voltage at the output terminal OUT.
DC is the duty cycle of the control signal DC.
$V_{in}$ is the voltage of the input voltage source.

For the duty cycle DC of 50%, the output voltage $V_{OUT}$ is equal to the input voltage $V_{IN}$. The output voltage $V_{OUT}$ is lower than the input voltage $V_{IN}$ for a duty cycle DC less than 50%, and the output voltage $V_{OUT}$ is higher than the input voltage $V_{OUT}$ for the duty cycle DC greater than 50%.

The description above does not take the parasitic resistances $R_W$ into account. In both boost and buck-boost switching DC-to-DC converters, the gain or the ratio of the output voltage $V_{OUT}$ to the input voltage $V_{IN}$ (Vout/Vin) is inversely proportional to (1-DC) which states voltage $V_{OUT}$ will reach infinity when the duty cycle DC=1.

The parasitic resistance $R_W$ is the total resistance in series with the inductor L. The parasitic resistance $R_W$ includes:
1. The equivalent series resistance (ESR) of the inductor L,
2. The parasitic resistances due to on-chip and off-chip connections,
3. The on-resistance due to diode D of FIG. 1 or pass PMOS transistor $M_4$ of FIG. 2 multiplied by one minus the duty cycle (1-DC),
4. The resistance of switch SW of FIG. 1 or the NMOS transistor $M_3$ of FIG. 2 multiplied by the duty cycle D, and
5. In buck-boost switching DC-to-DC converter, the resistance of PMOS transistor $M_1$ of FIG. 2 multiplied by the duty cycle D and the resistance of NMOS transistor $M_2$ of FIG. 2 multiplied by one minus the duty cycle (1-DC).

FIG. 3 is a plot of the effect of inductor winding resistance on the voltage gain of the boost switching DC-to-DC converter versus duty cycle of the prior art as shown in slide 25 of "Advanced Engineering Course on Power Management", Richard Redl, Lausanne, Switzerland, Aug. 26-30, 2013. The plot 5 which illustrates the gain of the boost switching DC-to-DC converter versus the duty cycle DC illustrates the rise in the gain toward infinity with the duty cycle DC increasing toward one with the parasitic resistance $R_W$ equal to zero. The plots 10, 15, 20, and 25 show the rise of the gain of the boost switching DC-to-DC converter to the peak values 30 where the slope becomes negative.

If the value of the duty cycle DC reaches right side or negative slope region beyond the peak 30, the output voltage $V_{OUT}$ will begin falling and the control loop of the boost switching DC-to-DC converter will increase the duty cycle D further. This results in positive feedback increasing the duty cycle DC and eventually duty cycle DC will be stuck at 100% and the output voltage $V_{OUT}$ will be some low voltage. This problem becomes more significant in buck-boost switching DC-to-DC converter where the pass PMOS transistor $M_1$ and PMOS transistor $M_4$ of FIG. 2 are in series with the inductor for any given cycle.

One practical solution for this issue of the prior art is setting a limit for the duty cycle DC (e.g. limiting the duty cycle DC at 60%, such that it will not increase further). The duty cycle limit $DC_{limit}$ is estimated considering the worst case scenario such as a minimum voltage level input voltage source $V_{in}$, worst case temperature, maximum on resistance of the pass PMOS transistor $M_1$, minimum load resistance $R_{LOAD}$, etc. Setting a limit for the duty cycle DC based on worst case conditions also limits the operation of the switching converter in optimal conditions, as the duty cycle DC can not exceed duty cycle limit signal $D_{limit}$ in cases where it could be beneficial for system performance to utilize higher values of the duty cycle DC. This especially true when the switching DC-to-DC converter is not operating at high load conditions.

SUMMARY

An object of this disclosure is to provide an adaptive duty cycle limiting circuit for a switching DC-to-DC converter.

Another object of this disclosure is to provide a switching DC-to-DC converter that adaptively defines a maximum limit for duty cycle such that the switching DC-to-DC converter does not enter a region where the gain of the switching DC-to-DC converter has a negative slope.

Further another object of this disclosure is to provide a switching DC-to-DC converter that uses feedback from circuit operation for defining an adaptive limit for duty cycle so that the switching DC-to-DC converter becomes more flexible and efficient.

To accomplish at least one of these objects, a duty cycle limit circuit formed within a switching DC-to-DC converter controls a maximum duty cycle of the switching DC-to-DC converter for preventing the duty cycle entering the region of operation where the gain of the switching DC-to-DC converter becomes negative. The duty cycle limit circuit has an amplitude adjustable ramp generator in communication with an output terminal of the switching DC-to-DC converter to receive an output voltage of the switching DC-to-DC converter and generate an output voltage ramp signal from the output voltage of the switching DC-to-DC converter. A variable voltage source that has an input connected to the input voltage source and provides an output voltage that is a fractional of the input voltage source. The output voltage level of the variable voltage source is applied to a first input of a comparator circuit and the output voltage ramp signal is applied to a second input of the comparator circuit. An output of the comparator circuit is a duty cycle limit signal that is communicated to a converter switching control circuit to adjust the duty cycle of the switching DC-to-DC converter to prevent the duty cycle entering the region of operation where the gain of the switching DC-to-DC converter becomes negative.

The converter switching control circuit has an OR logic circuit that receives the duty cycle limit signal and logically combines it with a feedback duty cycle signal for deactivating a boost switching circuit of the switching DC-to-DC converter.

In other embodiments that accomplish at least one of these objects, a duty cycle limit circuit formed within a switching DC-to-DC converter controls a maximum duty cycle of the switching DC-to-DC converter for preventing the duty cycle entering the region of operation where the gain of the switching DC-to-DC converter becomes negative. The duty cycle limit circuit has an amplitude adjustable ramp generator in communication with a reference voltage input terminal of the switching DC-to-DC converter to receive a reference voltage level of the switching DC-to-DC converter and from the reference voltage level generates a reference voltage ramp signal. A variable voltage source that has an input connected to the input voltage source and provides an output voltage that is a fractional value of the input voltage source. The fractional value is approximately one half multiplied by a feedback division ratio.

The output voltage level of the variable voltage source reference is applied to a first input of a comparator circuit and the output voltage ramp signal is applied to a second input of the comparator circuit. An output of the comparator circuit is a duty cycle limit signal that is communicated to converter switching control circuit to adjust the duty cycle of the switching DC-to-DC converter to prevent the duty cycle entering the region of operation where the gain of the switching DC-to-DC converter becomes negative.

The converter switching control circuit has an OR logic circuit that receives the duty cycle limit signal and logically combines it with a feedback duty cycle signal for deactivating a boost switching circuit of the switching DC-to-DC converter.

In other embodiments that accomplish at least one of these objects, a switching DC-to-DC converter has a duty cycle limit circuit for preventing the duty cycle entering the region of operation where the gain of the switching DC-to-DC converter becomes negative. The duty cycle limit circuit has an amplitude adjustable ramp generator in communication with an output terminal of the switching DC-to-DC converter to receive an output voltage of the switching DC-to-DC converter and from the output voltage of the switching DC-to-DC converter generates an output voltage ramp signal. A variable voltage source that has an input that is connected to the input voltage source and provides an output voltage that is a fractional value of the input voltage source. The output voltage level of the variable voltage source is applied to a first input of a comparator circuit and the output voltage ramp signal is applied to a second input of the comparator circuit. An output of the comparator circuit is a duty cycle limit signal that is communicated to converter switching control circuit to adjust the duty cycle of the switching DC-to-DC converter to prevent the duty cycle entering the region of operation where the gain of the switching DC-to-DC converter becomes negative.

The converter switching control circuit has an OR logic circuit that receives the duty cycle limit signal and logically combines it with a feedback duty cycle signal for deactivating a boost switching circuit of the switching DC-to-DC converter.

In other embodiments that accomplish at least one of these objects, a switching DC-to-DC converter has a duty cycle limit circuit for preventing the duty cycle entering the region of operation where the gain of the switching DC-to-DC converter becomes negative. The duty cycle limit circuit has an amplitude adjustable ramp generator in communication with a reference voltage input terminal of the switching DC-to-DC converter to receive a reference voltage level of the switching DC-to-DC converter and from the reference voltage level generates a reference voltage ramp signal. A variable voltage source that has an input that is connected to the input voltage source and provides an output voltage that is a fractional value of the input voltage source. The fractional value is approximately one half multiplied by a feedback division ratio.

The output voltage level of the variable voltage source is applied to a first input of a comparator circuit and the output voltage ramp signal is applied to a second input of the comparator circuit. An output of the comparator circuit is a duty cycle limit signal that is communicated to converter switching control circuit to adjust the duty cycle of the switching DC-to-DC converter to prevent the duty cycle entering the region of operation where the gain of the switching DC-to-DC converter becomes negative.

The converter switching control circuit has an OR logic circuit that receives the duty cycle limit signal and logically combines it with a feedback duty cycle signal for deactivating a boost switching circuit of the switching DC-to-DC converter.

In other embodiments that accomplish at least one of these objects, a method for operating a switching DC-to-DC converter for limiting duty cycle for preventing the duty cycle entering the region of operation where the gain of the switching DC-to-DC converter becomes negative. The method begins with setting an input reference voltage to a desired voltage level for maintaining a desired output voltage level of the switching DC-to-DC converter. A duty cycle ramp signal is generated and compared with a fractional value of a voltage level of an input voltage source. In various embodiments, the fractional value of the voltage level of the input voltage source is one half. In other embodiments, the fractional value of the voltage level of the input voltage source is one half multiplied by a feedback division ratio.

If the voltage level of the duty cycle ramp signal is greater than the fractional value of the voltage level of the input voltage source, the method is cycled through the steps. If the voltage level of the duty cycle ramp signal is less than the fractional value of the voltage level of the input voltage source, the cycle limit signal is activated and communicated to converter switching control circuit to adjust the duty cycle of the switching DC-to-DC converter to prevent the duty cycle entering the region of operation where the gain of the switching DC-to-DC converter becomes negative.

DETAILED DESCRIPTION

This disclosure provides circuits and methods for defining a maximum value of a duty cycle of a switching DC-to-DC converter such that as the parasitic resistance degrades the voltage gain of a switching DC-to-DC converter to the point that the slope of the voltage gain versus the duty cycle of the switching DC-to-DC converter becomes negative, the duty cycle is limited. To accomplish this, feedback from operation switching DC-to-DC converter is used for defining an adaptive limit of the duty cycle to prevent the switching DC-to-DC converter. The maximum limit of the duty cycle is modified in operation such that the switching DC-to-DC converter becomes more flexible and efficient and is simpler to implement and has limited circuit spread.

The switching DC-to-DC converter circuit of this disclosure is best suited for a boost and buck-boost switching DC-to-DC converter applications. For ease in understanding the structure of the switching DC-to-DC converter of this disclosure, the boost switching DC-to-DC converter as described in FIG. 1. The maximum duty cycle for the boost switching DC-to-DC converter is determined, as shown in Redl, by the equations:

$$V_{IN}I_L = R_W I_L^2 + \frac{V_{OUT}^2}{R_{LOAD}} \qquad \text{Eq. 1}$$

Where
$V_{in}$ is the voltage of the input voltage source.
$I_L$ is the current flowing through the inductor L
$R_W$ is the resistive value of the parasitic resistances.
$V_{OUT}$ is the voltage at the output terminal OUT.
$R_{LOAD}$ is the load resistance of the boost switching DC-to-DC converter.

Eq. 1 demonstrates that the input power is equal to the sum of the resistive loss and the output power.

$$(1 - DC)I_L = \frac{V_{OUT}}{R_{LOAD}} \qquad \text{Eq. 2}$$

Figure 1:
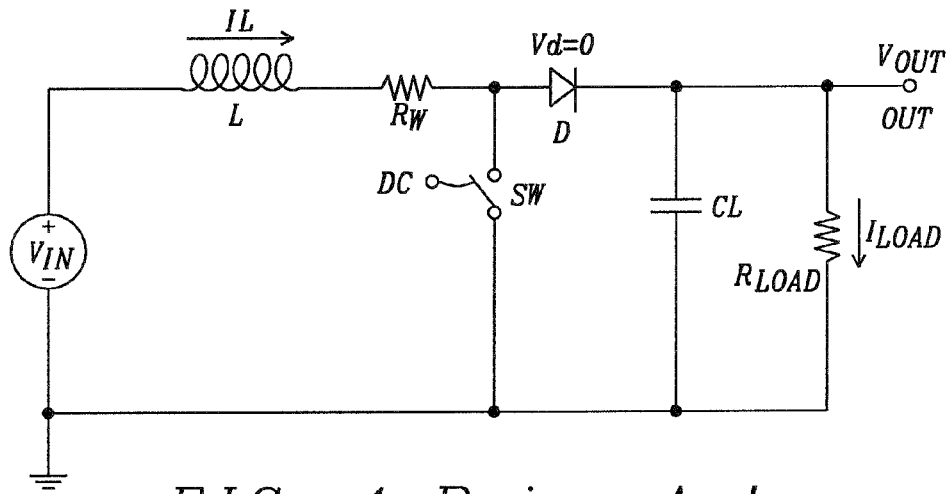
FIG. 1 is schematic of a boost switching DC-to-DC converter of the prior art.
Figure 2:
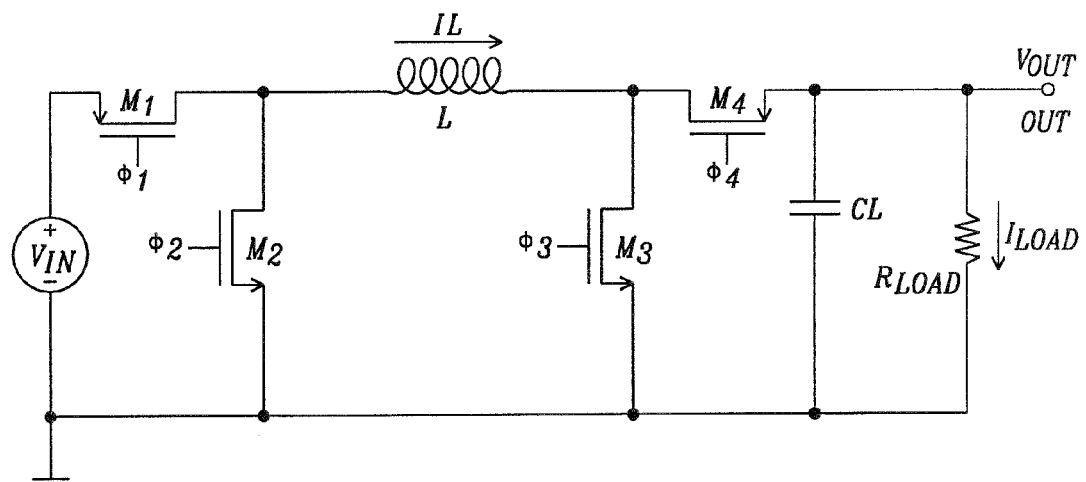
FIG. 2 is schematic of a buck-boost switching DC-to-DC converter of the prior art.

From charge balance equation of Eq. 2, the average current through the diode D of FIG. 1 is equal to the load current $I_{LOAD}$.

Figure 3:
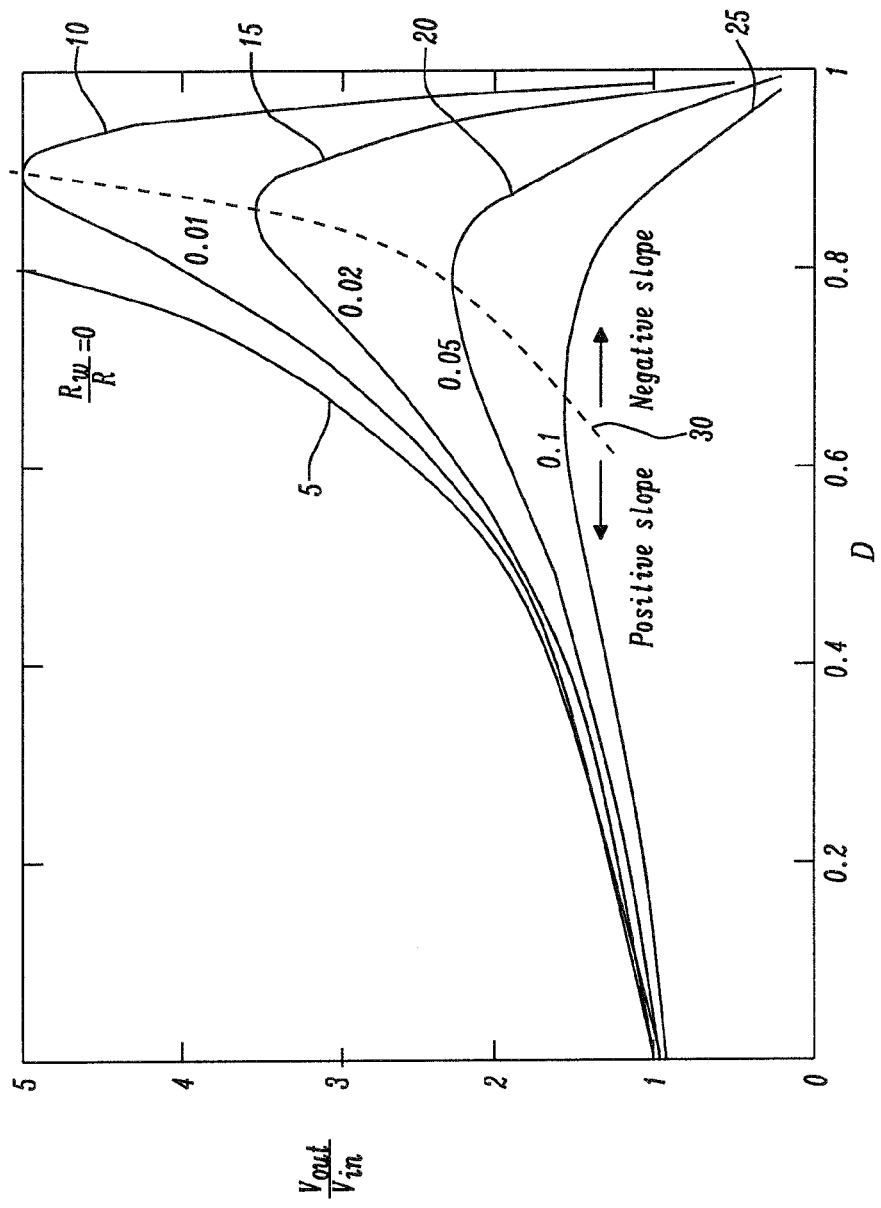
FIG. 3 is a plot of the effect of parasitic resistance on the voltage gain of the boost switching DC-to-DC converter versus duty cycle of the prior art.

By solving Eq. 1 and Eq. 2, the function for determining the plots of FIG. 3 is given by Eq. 3 as:

$$\frac{V_{OUT}}{V_{IN}} = \frac{1}{1-DC} * \frac{1}{1 + \frac{R_W}{(1-DC^2)R_{LOAD}}} \qquad \text{Eq. 3}$$

The maximum duty cycle $DC_{max}$ is determined by taking the derivative of Eq. 3 with respect to the duty cycle DC and solving the derivative of Eq. 3 equal to zero to find the value of the duty cycle DC where the gain Vout/Vin of the switching DC-to-DC converter circuit has a peak. The maximum duty cycle $DC_{max}$ is equal to:

$$DC_{max} = 1 - \sqrt{\frac{R_W}{R_{LOAD}}} \qquad \text{Eq. 4}$$

The maximum duty cycle $DC_{max}$ value should be the actual limit for duty cycle ($D_{LIMIT}$). But it has to be expressed in terms of parameters more compatible with analog design components of the switching DC-to-DC converter circuit. Therefore, Eq. 4 is substituted into Eq. 3 at the duty cycle DC equal to the maximum duty cycle $DC_{max}$. This achieves the equation:

$$\frac{V_{OUT}}{V_{IN}} = \frac{1}{2}\sqrt{\frac{R_{LOAD}}{R_W}} \qquad \text{Eq. 5}$$

and $$\frac{V_{OUT}}{V_{IN}} = \frac{1}{2(1 - DC_{max})} \qquad \text{Eq. 6}$$

If eq. 6 is rearranged, the maximum duty cycle becomes a function of the input voltage according to the equation:

$$V_{OUT}(1 - DC_{max}) = \frac{V_{in}}{2} \qquad \text{Eq. 7}$$

Thus a condition for stability that ensures the boost switching DC-to-DC converter operates in the positive slope region to the left of the Line 30 of FIG. 3. Thus the condition for stability becomes:

$$V_{OUT}(1 - DC) > \frac{V_{in}}{2} \qquad \text{Eq. 8}$$

Figure 4:
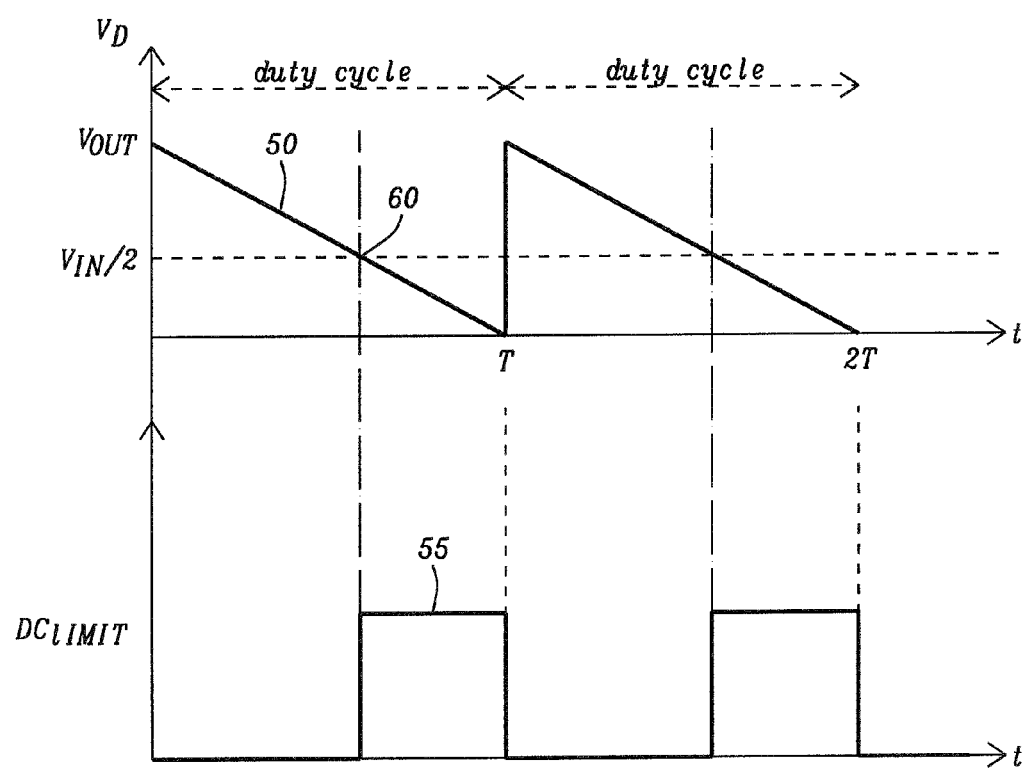
FIG. 4 is a plot of the duty cycle ramp voltage and the duty cycle limit voltages.

FIG. 4 is a plot of the duty cycle ramp voltage 50 and the duty cycle limit voltage 55 of Equation 7. The duty cycle ramp voltage 50 is formed to have a peak that is the voltage level $V_{OUT}$ at the output terminal OUT of the boost switching DC-to-DC converter. The duty cycle limit signal 55 is the logical level that is set such that the switch SW of FIG. 1 is deactivated until the end of the cycle. The deactivated switch SW causes the current IL through the inductor L to flow through the diode D to the output terminal OUT, the capacitor CL, and the load resistor $R_{LOAD}$. The deactivation 60 of the switch SW occurs when the voltage level $V_{OUT}$ at the output terminal OUT is equal to a voltage level $V_{IN/2}$ that is one half of the voltage level $V_{OUT}$ at the output terminal OUT. The next cycle starts when the switch SW is activated at the time T.

In an implementation embodying the principals of the present disclosure, a comparator will compare the voltage level $V_{IN/2}$ with the duty cycle ramp voltage 50 to determine the duty cycle limit signal 55. The compare voltage level $V_{IN/2}$ may preferably with some margin to generate the duty cycle limit signal 55.

Figure 5:
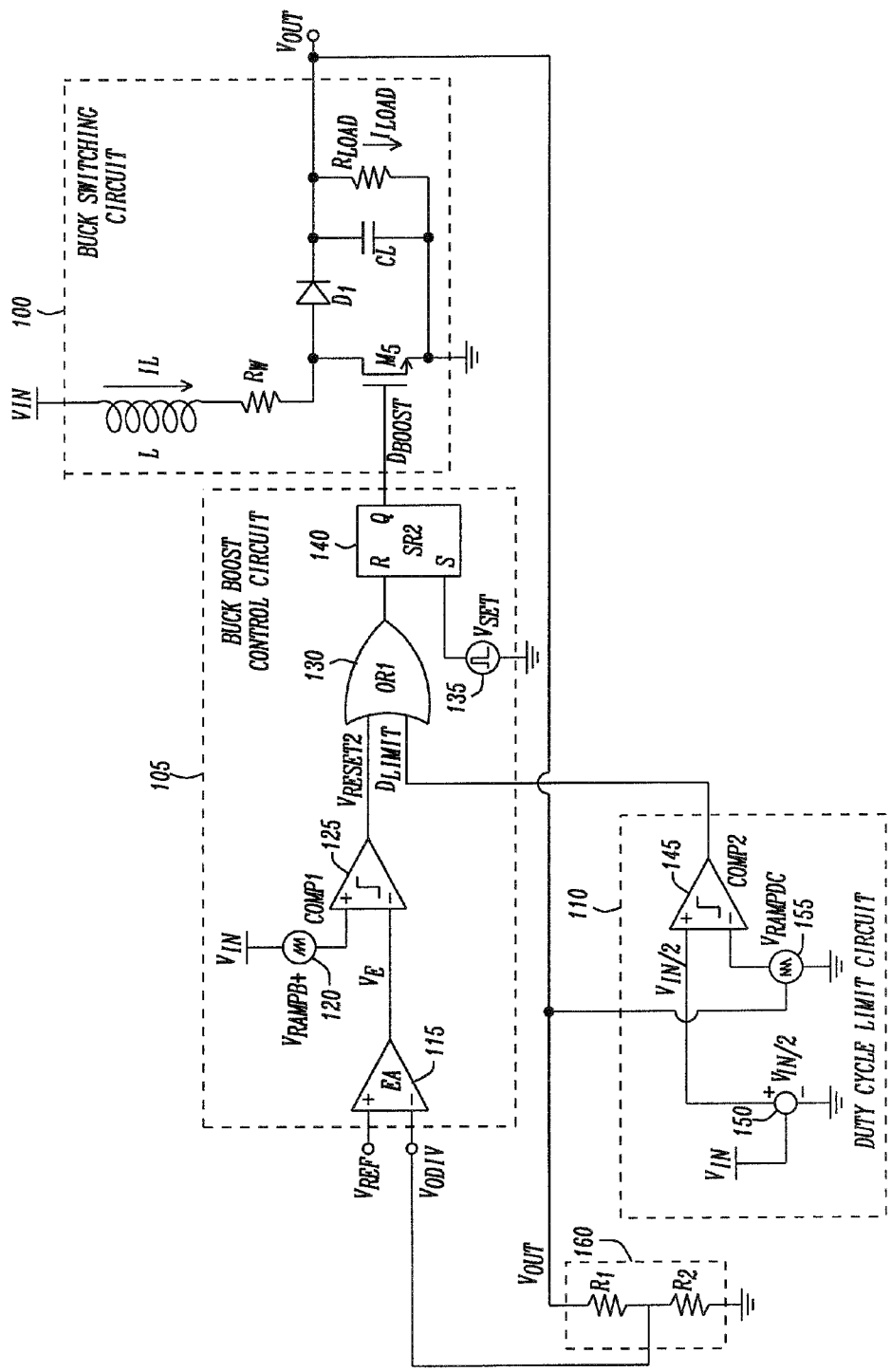
FIG. 5 is schematic of a boost switching DC-to-DC converter embodying the principals of the present disclosure.

FIG. 5 is schematic of a boost switching DC-to-DC converter embodying the principals of the present disclosure. The boost switching DC-to-DC converter includes a boost switching circuit 100 that has an inductor L with a first terminal connected to a first terminal of a duty cycle limit circuit 110. The associated parasitic resistances $R_W$ of the boost switching DC-to-DC converter is shown as a series resistance with the inductor L. The first terminal of the parasitic resistances $R_W$ is connected to a second terminal of the inductor L. The second terminal of the parasitic resistances $R_W$ is connected to a drain of a switching NMOS transistor $M_S$ and the anode of a diode D. The cathode of the diode D is connected to a first terminal of a filter capacitor CL and a first terminal of a load resistance $R_{LOAD}$. The cathode of the diode D, the first terminal of a filter capacitor CL, and the first terminal of a load resistance $R_{LOAD}$ form the output terminal OUT of the boost switching DC-to-DC converter. A duty cycle control signal $D_{BOOST}$ is applied to the gate of the switching NMOS transistor $M_5$ and the source of the switching NMOS transistor $M_5$ is connected to the ground reference voltage source. The second terminals of the filter capacitor CL, and the load resistance $R_{LOAD}$ are connected to the ground reference voltage source.

The duty cycle control signal $D_{BOOST}$ is generated by the boost control circuit 105. The boost control circuit 105 receives a reference voltage $V_{REF}$ that provides a reference voltage level that is indicative of the output voltage level $V_{OUT}$. The output voltage $V_{OUT}$ is applied to a first terminal of the first divider resistor $R_1$ of the voltage divider 160. The second terminal of the first divider resistor $R_1$ is connected to a first terminal of a second divider resistor $R_2$. The common connection of the second terminal of the first divider resistor $R_1$ and the second terminal of the second divider resistor $R_2$ provides a scaled voltage $V_{ODIV}$ from the voltage divider 160. The scaled voltage $V_{ODIV}$ is scaled by the factor $$\frac{R_2}{R_1 + R_2}$$

from the output voltage level $V_{OUT}$ and is applied to the control circuit 105.

The reference voltage $V_{REF}$ and the scaled voltage $V_{ODIV}$ are the inputs to an error amplifier 115. The output of the error amplifier 115 is an error signal $V_E$ that is the voltage level of the difference between the voltage levels of the reference voltage $V_{REF}$ and the scaled voltage $V_{ODIV}$. A ramp generator 120 produces a boost ramp signal $V_{RAMPB+}$ that is applied to the noninverting input of the comparator 125. The error signal $V_E$ is applied to the inverting input of the comparator 125. The boost ramp signal $V_{RAMPB-}$ is compared with the error signal $V_E$ to produce a reset signal $V_{RESET}$ at the output of the comparator 125 that is applied to a first terminal the logical OR circuit 130. The second terminal of the logical OR circuit 130 receives a duty cycle limit signal $D_{LIMIT}$. The duty cycle limit signal $D_{LIMIT}$ provides the indication that the gain $$\left(\frac{V_{OUT}}{V_{IN}}\right)$$

of the boost switching DC-to-DC converter is at a point of inflection or has started to decrease for indicating that the duty cycle must be reduced. The output of the logical OR circuit 130 is applied to the reset terminal R of the set-reset latch 140.

The set clock generator 135 generates a set clock signal $V_{SET}$ that is applied to the set terminal S of the set-reset latch 140. The output Q of the set-reset latch 140 is connected to the gate of the boost switching NMOS transistor $M_2$ to provide the boost switching control signal $D_{BOOST}$. The boost switching control signal $D_{BOOST}$ activates the switching NMOS transistor $M_5$ to divert the inductor current IL to the ground reference voltage source when the set terminal S of the set-reset latch 140 is activated such that the output Q turns on the switching NMOS transistor $M_5$.

A duty cycle limit circuit 110 generates the duty cycle limit signal $D_{LIMIT}$ that is applied to the second terminal of the logical OR circuit 130. The duty cycle limit circuit 110 has a variable voltage source 150 that receives the voltage of the input voltage source $V_{IN}$. The variable voltage source 150 divides the voltage level of the input voltage source $V_{IN}$ by approximately one-half to generate the compare voltage level $V_{IN/2}$ that is applied to the noninverting terminal of the comparator 145. The output voltage $V_{OUT}$ is applied to a ramp generator 155 that generates a ramp signal $V_{RAMPDC}$ that has a peak amplitude that is approximately the voltage level of the output voltage $V_{OUT}$. The ramp signal $V_{RAMPDC}$ is applied to the inverting terminal of the comparator 145. The output of the comparator is the duty cycle limit signal $D_{LIMIT}$ that is applied to the logical OR circuit 130 to cause the reset terminal R of the set-reset latch 140 to activate thus causing the switching NMOS transistor $M_5$ to turn off truncating the duty cycle of the boost switching DC-to-DC converter to insure that the boost switching DC-to-DC converter operates in the positive slope region to the left of the Line 30 of FIG. 3. It is apparent that generating the duty cycle limit signal $D_{LIMIT}$ is independent of load current $I_{LOAD}$, temperature, process and any parasitic resistances $R_W$ in series with the inductor L. This results in a wide operational range for the boost switching DC-to-DC converter with different internal/external components.

The operation of the boost switching DC-to-DC converter begins with the activation of the input voltage source $V_{in}$. The switching NMOS transistor $M_2$ is turned off and the diode D is polarized to be conducting to allow current to flow from the input voltage source $V_{in}$ through the inductor L, the parasitic resistances $R_W$, the diode D and the load resistance RL. A portion of the inductor current IL charges the capacitor CL. The set clock generator 135 generates the set clock signal $V_{SET}$ to set the set-reset latch 140 such that the switching NMOS transistor $M_2$ is turned on and the inductor current IL is shunted to the ground reference voltage source and the diode D is inversely polarized and nonconducting. Consequently, there is no connection between the input voltage source $V_{in}$ and the load resistance RL and thus the voltage across the load resistance RL is developed by the charge of the capacitor CL.

When the error voltage $V_E$ as applied to the inverting input of the comparator 125 is greater than the voltage of the boost ramp signal $V_{RAMPB+}$ that is applied to the noninverting input of the comparator 125, a reset signal $V_{RESET}$ is produced at the output of the comparator 125 that is applied to a first terminal the logical OR circuit 130. The output of the logical OR circuit 130 is applied to the reset terminal of the set-reset latch 140 is deactivated such that the output Q turns off the switching NMOS transistor $M_5$. The diode D is polarized to be conducting to allow current to flow from the input voltage source $V_{in}$ through the inductor L, the parasitic resistances $R_W$, the diode D and the load resistance RL. A portion of the inductor current IL charges the capacitor CL. The output voltage $V_{OUT}$ rises until the set clock generator 135 generates the set clock signal $V_{SET}$ to set the set-reset latch 140 such that the switching NMOS transistor $M_5$ is turned on and the cycle is repeated.

If the output load current $I_{LOAD}$ is sufficiently large that the duty cycle generated from the first comparator 125 is greater than the duty cycle limit signal $D_{LIMIT}$, the duty cycle limit signal $D_{LIMIT}$ triggers the reset signal of the set-reset latch 140 to deactivate the output Q to turn off the switching NMOS transistor $M_5$ to prevent the t the boost switching DC-to-DC converter from operating in the negative slope region to the right of the Line 30 of FIG. 3.

The principals of the circuit that embody the present disclosure can be regarded as a protection circuit. The circuit as shown above insures that the control loop of the switching DC-to-DC converter is always in positive slope range. It is desirable that the protection turns on during load transients and input voltage source $V_{IN}$ transients.

In various embodiments, the output voltage $V_{OUT}$ is converted to a current by dividing the output voltage $V_{OUT}$ by a scaling resistance $R_D$ ($V_{OUT}/R_D$). The current is converted to a sawtooth shaped current $I_{SAW}$. The sawtooth current signal $I_{SAW}$ is set to a zero (0) ampere level at the start of the duty cycle and will be equal to the current $V_{OUT}/R_D$ at the end of duty cycle.

The resulting current is multiplied by resistance $R_D$ to generate the duty cycle limit voltage $V_D$ as defined by the equation Eq. 9:

$$V_D = R_D \left( \frac{V_{OUT}}{R_D} - I_{SAW} \right) = \frac{V_{IN}}{2} \qquad \text{Eq. 9}$$

As is known in the art the output voltage $V_{OUT}$ is subject to line and load transients and other transient noise sources. To mitigate these sources, the output voltage $V_{OUT}$ should be replaced with the reference voltage $V_{REF}$, since it is immune to the transients. The reference voltage $V_{REF}$ is related to the output voltage $V_{OUT}$ by the equation Eq. 10:

$$V_{OUT} = V_{REF} \frac{R_1 + R_2}{R_2} \qquad \text{Eq. 10}$$

Where
$V_{REF}$ is the fixed reference voltage for the error amplifier.
$R_1$ is first divider resistor of the voltage divider 160 of FIG. 5.
$R_2$ is second divider resistor of the voltage divider 160 of FIG. 5.

Substituting Eq. 10 into Eq. 8 and dividing and multiplying by the scaling resistance $R_D$ to calculate the duty cycle limit voltage $V_D$ according to the equation:

$$V_D = R_D \frac{R_1 + R_2}{R_2} \left( \frac{V_{REF}}{R_D} - DC \frac{V_{REF}}{R_D} \right) = \frac{V_{IN}}{2} \qquad \text{Eq. 11}$$

Where $$\frac{R_1 + R_2}{R_2} DC \frac{V_{REF}}{R_D} = I_{SAW} \qquad \text{Eq. 12}$$

As is apparent, the sawtooth shaped current $I_{SAW}$ is proportional to the duty cycle. From the proportionality of the reference voltage level $V_{REF}$ to the output voltage level $V_{OUT}$ of Eq. 10, the reference voltage level $V_{REF}$ is developed according to the equation Eq. 13:

$$V_{REF}(1 - DC_{MAX}) = \frac{V_{in}}{2} \left( \frac{R_2}{R_1 + R_2} \right) \qquad \text{Eq. 13}$$

The reference voltage level $V_{REF}$ and the voltage level of the input voltage source $V_{in}$ is converted to currents by dividing by a scaling resistance $R_D$ according to the equation Eq. 14

$$R_D \left( \frac{V_{REF}}{R_D} - \frac{DC_{MAX} V_{REF}}{R_D} \right) = \frac{V_{in}}{2} \left( \frac{R_2}{R_1 + R_2} \right) \qquad \text{Eq. 14}$$

Figure 6:
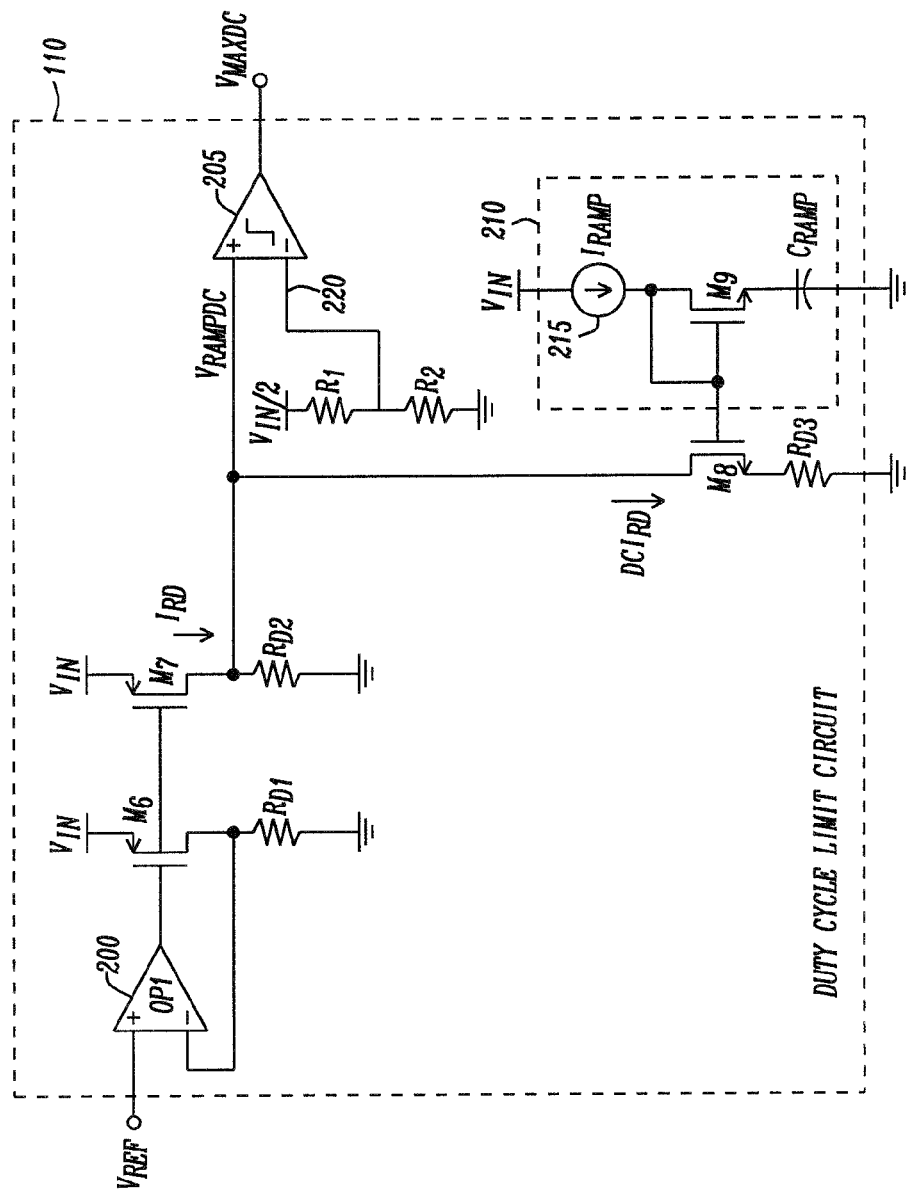
FIG. 6 is a schematic of a duty cycle limiting circuit of the boost switching DC-to-DC converter of FIG. 5 embodying the principals of the present disclosure.

FIG. 6 is a schematic of an implementation of a duty cycle limiting circuit 110 of the boost switching DC-to-DC converter of FIG. 5 embodying the principals of the present disclosure. The reference voltage $V_{REF}$ is applied to a noninverting input terminal of an operational amplifier 200. The operational amplifier 200 is configured as a unity gain amplifier having its output connected to the gates of the PMOS transistors $M_6$ and $M_7$. The drain of the PMOS transistor $M_6$ is connected as a feedback loop to the input of the inverting terminal of operational amplifier 200. The source of the PMOS transistor $M_6$ is connected to the input voltage source $V_{in}$. The drain of the PMOS transistor $M_6$ is also connected to a first terminal of a first scaling resistor $R_{D1}$. A second terminal of the first scaling resistor $R_{D1}$ is connected to the ground reference voltage source.

The drain of the PMOS transistor $M_7$ is connected to the inverting terminal of comparator 205. The source of the PMOS transistor $M_7$ is connected to the input voltage source V. The drain of the PMOS transistor $M_7$ is connected to a first terminal of a second scaling resistor $R_{D2}$. A second terminal of the second scaling resistor $R_{D2}$ is connected to the ground reference voltage source. The current $I_{RD}$ through the PMOS transistor $M_7$ is equal to the reference voltage $V_{REF}$ divided by the resistance of the second scaling resistor $R_{D2}$.

The drain of the PMOS transistor $M_7$ and the first terminal of a second scaling resistor $R_{D2}$ are connected to a drain of a first NMOS transistor $M_8$. The source of the first NMOS transistor $M_8$ is connected to the ground reference voltage source. The first NMOS transistor $M_8$ and a second NMOS transistor $M_9$ have their gates commonly connected and connected to the drain of second NMOS transistor $M_9$ to form a current mirror. The second NMOS transistor $M_9$ provides the reference leg of the current mirror, with the drain of the second NMOS transistor $M_9$ connected to the ramp current source 215. The ramp current source 215 provides a current $I_{RAMP}$ to the drain of the second NMOS transistor $M_8$. The current passed through the second NMOS transistor $M_9$ to the first plate of the capacitor $C_{RAMP}$. The second plate of the capacitor $C_{RAMP}$ is connected to the ground reference voltage source. The ramp current source 215, the second NMOS transistor $M_9$, and the capacitor $C_{RAMP}$ form a ramp generator 210 which has a ramp time based on the current $I_{RAMP}$ and the capacitance of the capacitor $C_{RAMP}$. The mirror leg of the current mirror is the first NMOS transistor $M_8$ that has a current that equal to the current $I_{RD}$ multiplied by the duty cycle DC and establishes the ramp signal $V_{RAMPDC}$ at the inverting terminal of the comparator 205.

A voltage $V_{in/2}$ that is one half of the input voltage source $V_{in}$ is applied to a first terminal of the first divider resistor $R_1$. The second terminal of the first divider resistor $R_1$ is connected to the first terminal of the second divider resistor $R_2$ and the second terminal of the second divider resistor $R_2$ is connected to the ground reference voltage source. The first divider resistor $R_1$ and second divider resistor $R_2$ form a voltage divider similar to that of the voltage divider 160 of FIG. 5 that has the feedback resistive ratio of the boost switching DC-to-DC converter of FIG. 5. The divider voltage 220 developed at the common connection of the second terminal of the first divider resistor $R_1$ and the first terminal of the second divider resistor $R_2$ is one half of the input voltage source $V_{in}$ scaled by the feedback resistive ratio $$\left( \frac{R_2}{R_1 + R_2} \right).$$

Figure 7:
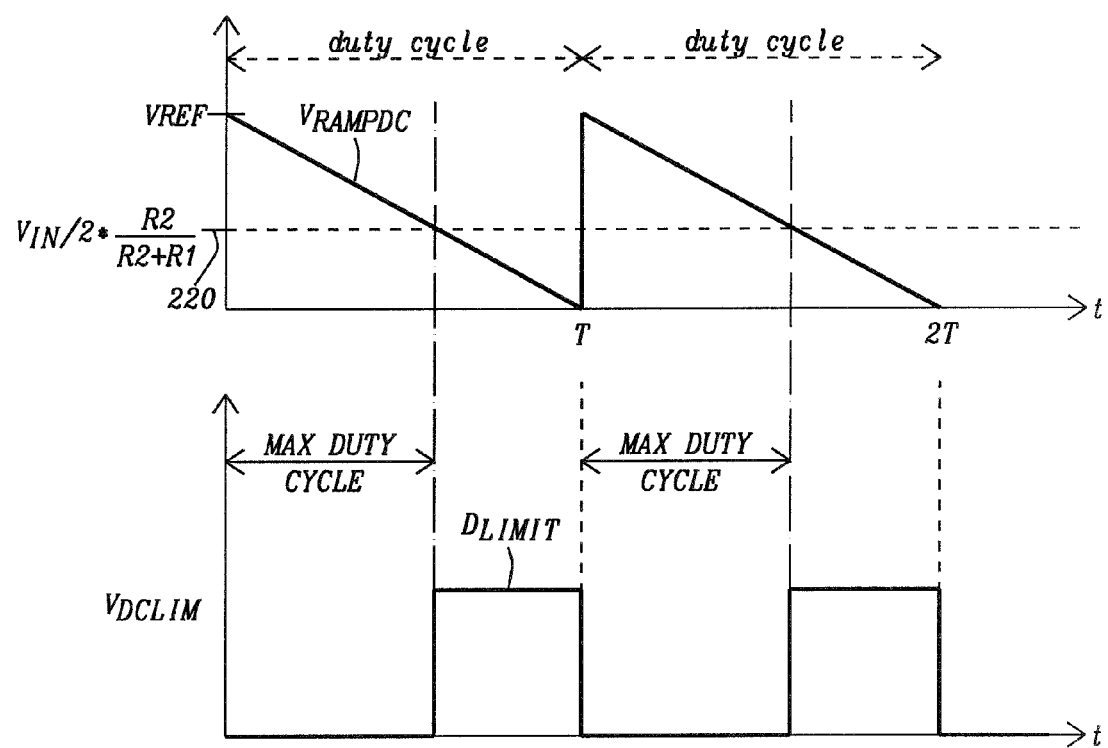
FIG. 7 is a plot of the duty cycle ramp voltage and the duty cycle limit voltages of FIG. 6.

FIG. 7 is a plot of the duty cycle ramp voltage $V_{RAMPDC}$ and the duty cycle limit signal $D_{limit}$ of FIG. 6. The duty cycle ramp voltage $V_{RAMPDC}$ has a peak voltage that is the reference voltage $V_{REF}$. The duty cycle ramp voltage $V_{RAMPDC}$ decreases in amplitude, as described above, until the duty cycle ramp voltage $V_{RAMPDC}$ reaches the divider voltage level 220. At the divider voltage level 220, the duty cycle limit signal $D_{limit}$ is activated and the reset terminal of the set-reset latch 140 is reset until the set clock generator 135 generates the next set clock signal $V_{SET}$ that is applied to the set terminal S of the set-reset latch 140 to start the next cycle of the boost switching DC-to-DC converter.

Figure 8:
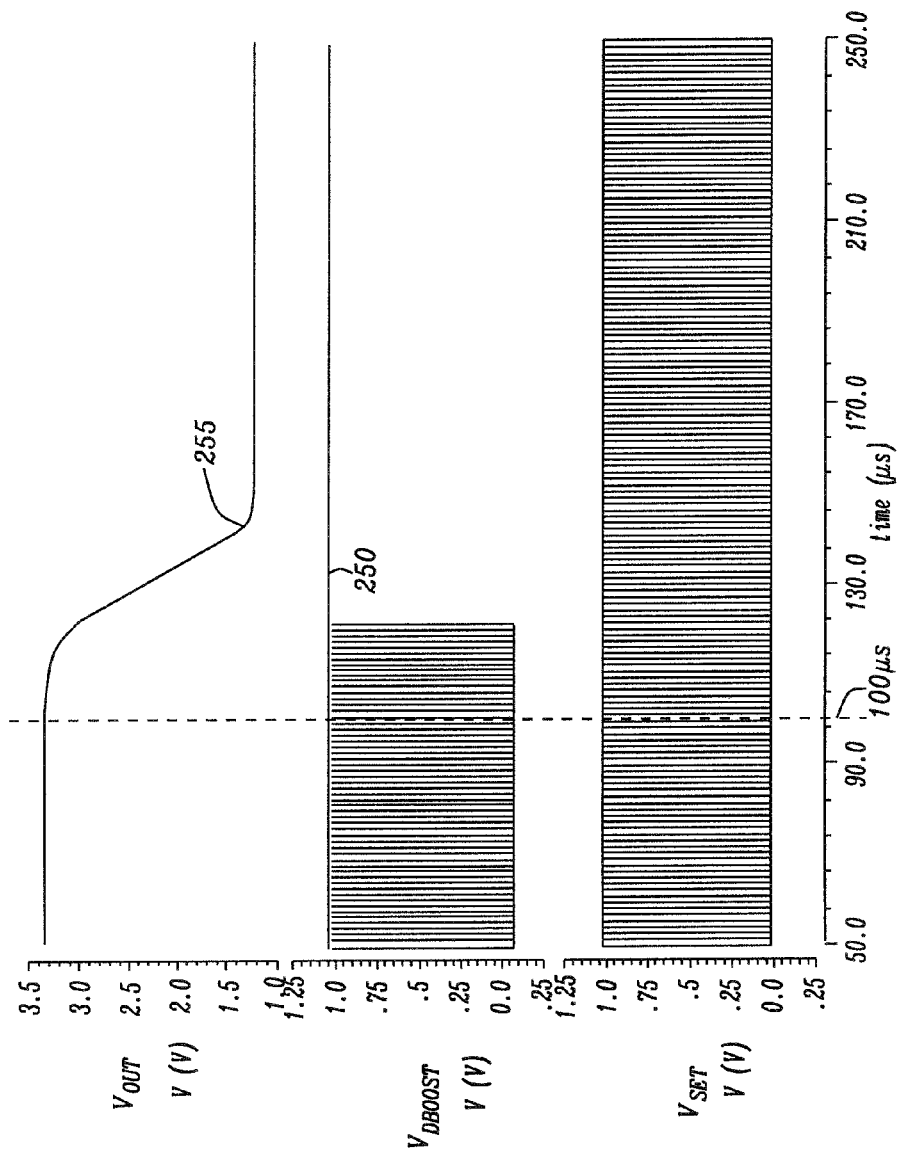
FIG. 8 is a plot of simulation results of the boost switching DC-to-DC converter of the prior art of FIG. 1.

FIG. 8 is a plot of simulation results of the boost switching DC-to-DC converter of the prior art of FIG. 1. The boost switching DC-to-DC converter has an input voltage source $V_{in}$ equal to 2.5V with the set clock generator 135 set the frequency of the clock signal $V_{SET}$ to approximately 3 MHz. At the time 100 μs, the load current begins to increase and output voltage $V_{OUT}$ starts to decrease. With no duty cycle limit, the duty cycle control signal $D_{BOOST}$ is activated 250 continuously and the switching NMOS transistor $M_5$ is turned on. The output voltage $V_{OUT}$ decreases until it collapses 255 to a voltage approaching 1.2V from an output voltage $V_{OUT}$ of approximately 3.3V.

Figure 9:
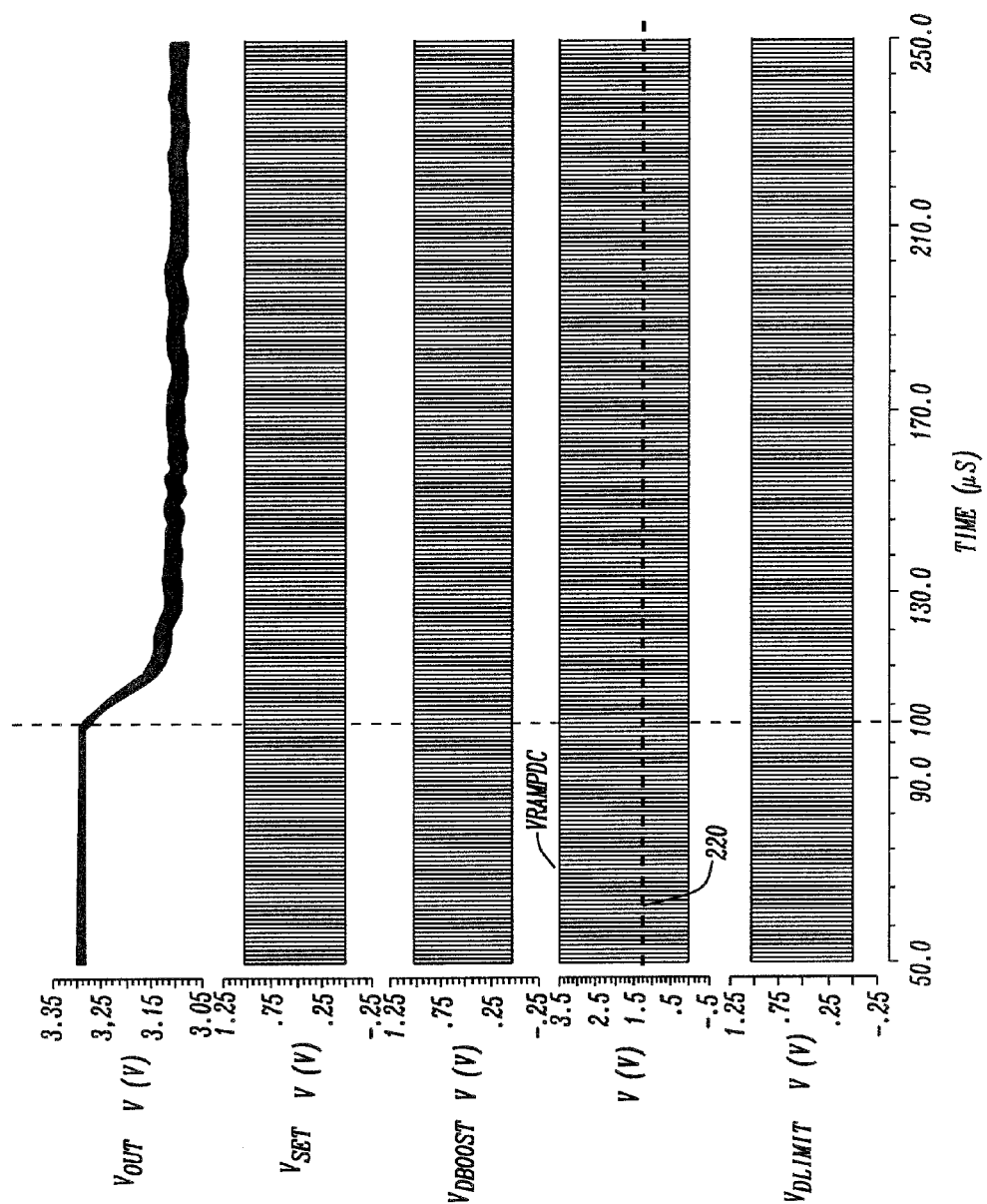
FIG. 9 is a plot of the simulation results of the boost switching DC-to-DC converter embodying the principals of the present disclosure.
Figure 10A:
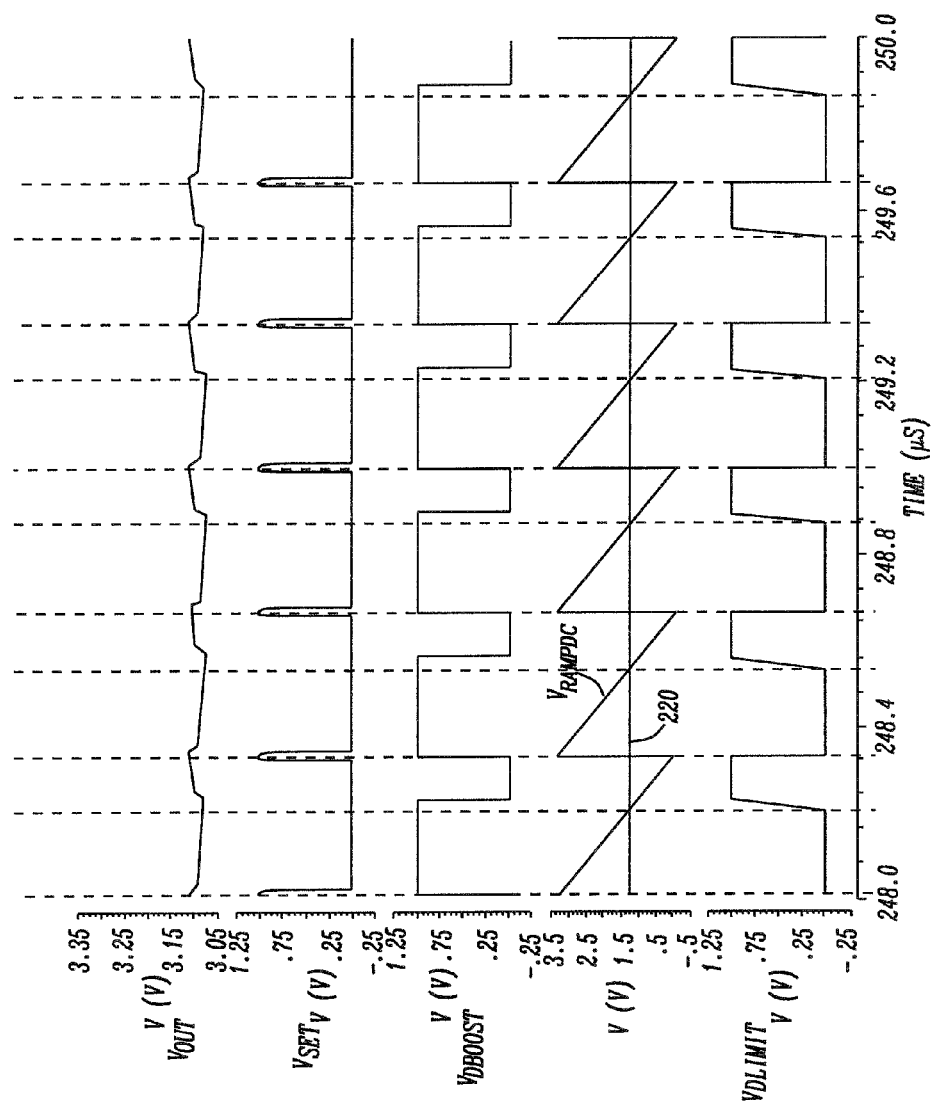
FIG. 10a is a plot of the simulation results of the boost switching DC-to-DC converter embodying the principals of the present disclosure as shown in FIG. 7 with expanded time scale.
Figure 10B:
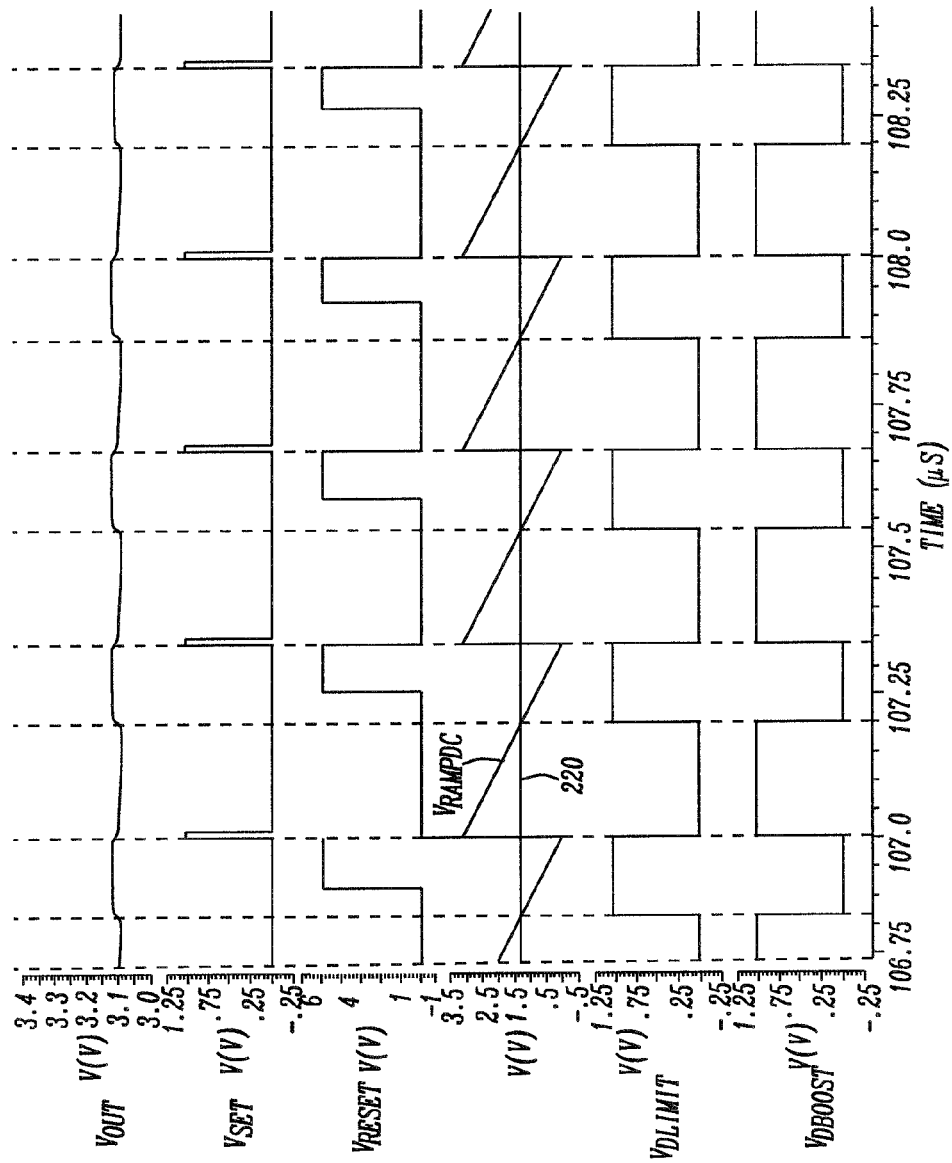
FIG. 10b is a plot of the simulation results of the boost switching DC-to-DC converter illustrating the beginning of the functioning of the duty cycle limit circuit embodying the principals of the present disclosure as shown in FIG. 7 with expanded time scale.

FIG. 9 is a plot of the simulation results of the boost switching DC-to-DC converter embodying the principals of the present disclosure. FIG. 10a is a plot of the simulation results of the boost switching DC-to-DC converter embodying the principals of the present disclosure as shown in FIG. 7 with expanded time scale. FIG. 10b is a plot of the simulation results of the boost switching DC-to-DC converter illustrating the beginning of the functioning of the duty cycle limit circuit embodying the principals of the present disclosure as shown in FIG. 7 with expanded time scale. The boost switching DC-to-DC converter has the input voltage source $V_{in}$ equal to 2.5V with the set clock generator 135 set the frequency of the clock signal $V_{SET}$ to approximately 3 MHz. At the time 100 μs, the load current begins to increase and output voltage $V_{OUT}$ starts to decrease. When load current increases with the duty cycle limit circuit 110 operating, the duty cycle control signal $D_{BOOST}$ is activated 250 to increase the period to turn on the switching NMOS transistor $M_5$ longer and the output voltage $V_{OUT}$ decreases in amplitude. When the duty cycle has increased sufficiently long, the duty cycle limit signal $D_{limit}$ will now limit the duty cycle and control the period of the turn on of the switching NMOS transistor $M_5$. The output voltage $V_{OUT}$ now only decreases to a voltage level of approximately 3.1V.

Referring to FIG. 10a, the clock signal $V_{SET}$ defines the start of the duty cycle control signal $D_{BOOST}$ but as the load increases and the duty cycle is impacted such that the reset signal $V_{RESET}$ is not resetting the set-reset latch 140 correctly, the duty cycle limit signal $D_{limit}$ will now limit the duty cycle. As described above, when the duty cycle ramp voltage $V_{RAMPDC}$ is equal to the divider voltage level 220, the duty cycle limit signal $D_{limit}$ is activated to limit the duty cycle by resetting the set-reset latch 140 to turn off the switching NMOS transistor $M_5$. The inductor current IL begins to decrease until the next cycle of the clock signal $V_{SET}$.

Referring to FIG. 10b, the duty cycle starts with the clock signal $V_{SET}$ and the duty cycle control signal $D_{BOOST}$ is activated. The duty cycle control signal $V_{DBOOST}$ is expected to end when the output of the reset signal $V_{RESET}$ at the output of the comparator 125 is activated. However when load current $I_{LOAD}$ increases, the duty cycle limit circuit 110 assumes control with the duty cycle limit signal $D_{limit}$ being activated and the duty cycle limit signal $D_{limit}$ as applied to the input of the logical OR circuit 130 causes the output of the logical OR circuit 130 to the reset the set-reset latch 140. The output signal $V_{DBOOST}$ of the reset the set-reset latch 140 deactivates the NMOS transistor $M_5$. The cycle complete and now awaits the arrival of the next clock signal $V_{SET}$.

Figure 11:
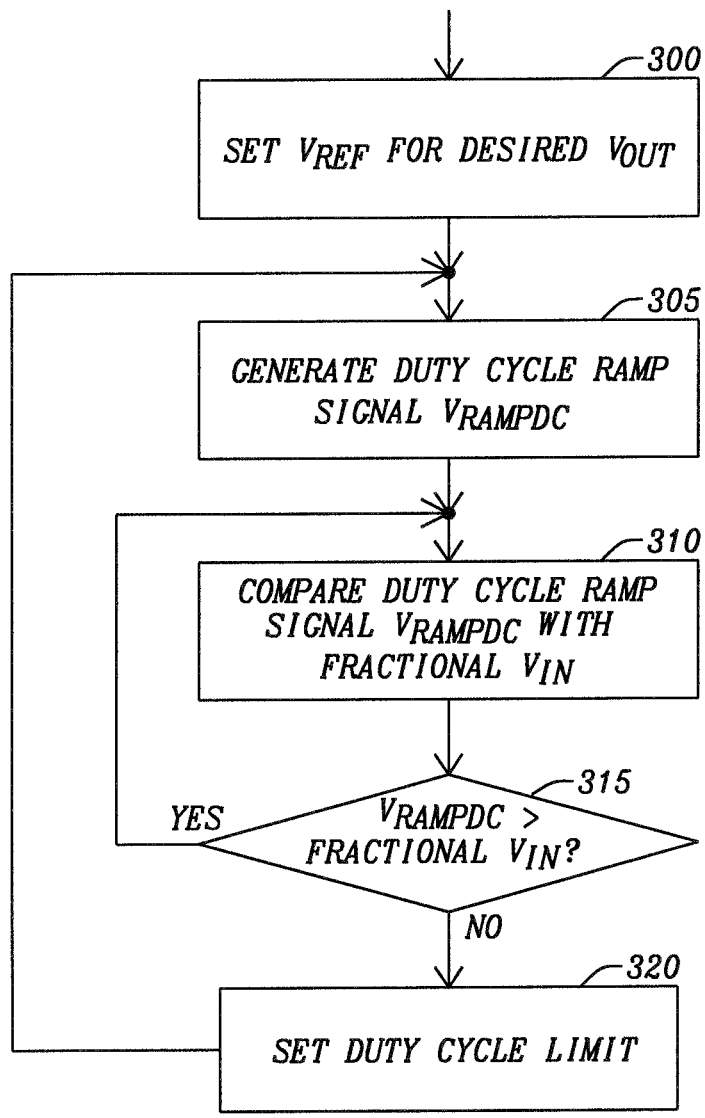
FIG. 11 is flow chart of a method for limiting duty cycle of boost switching DC-to-DC converter embodying the principals of the present disclosure.

FIG. 11 is flow chart of a method for limiting duty cycle of boost switching DC-to-DC converter embodying the principals of the present disclosure. Referring to FIGS. 5 and 11, the reference voltage is set (Box 300) to a voltage level that will product the desired output voltage level $V_{OUT}$. A duty cycle ramp signal $V_{RAMPDC}$ is generated (Box 305). In some embodiments, the duty cycle ramp has a maximum voltage of the voltage level of the output voltage level $V_{OUT}$ as shown in FIG. 5 or the reference voltage $V_{REF}$ as shown in FIG. 6. The duty cycle ramp signal $V_{RAMPDC}$ is compared with a fractional voltage level of the input voltage source $V_{IN}$ (Box 310). If the duty cycle ramp signal $V_{RAMPDC}$ has a maximum voltage level of output voltage level $V_{OUT}$, the fraction voltage level of the input voltage source $V_{IN}$ is one half the voltage level of the input voltage source $V_{IN}$. If the duty cycle ramp signal $V_{RAMPDC}$ has a maximum voltage level of reference voltage level $V_{REF}$, the fraction voltage level of the input voltage source $V_{IN}$ is one half the voltage level of the input voltage source $V_{IN}$ multiplied by the feedback resistive ratio $$\left(\frac{R_2}{R_1+R_2}\right).$$

It is then determined (Box 315) if the duty cycle ramp signal $V_{RAMPDC}$ is greater than the fractional fraction voltage level of the input voltage source $V_{IN}$. If the duty cycle ramp signal $V_{RAMPDC}$ is greater than the fractional fraction voltage level of the input voltage source $V_{IN}$, the comparison (Box 310) continues until the duty cycle ramp signal $V_{RAMPDC}$ is not greater than the fractional fraction voltage level of the input voltage source $V_{IN}$. When the duty cycle ramp signal $V_{RAMPDC}$ is not greater than the fractional fraction voltage level of the input voltage source $V_{IN}$, the duty cycle limit $D_{LIMIT}$ is set (Box 320). The next cycle is started with the generation (Box 305) of the duty cycle ramp signal $V_{RAMPDC}$.

The principals embodying this disclosure in FIGS. 5 and 6 uses a boost switching DC-to-DC converter. This structure for the duty cycle limiting circuit is not limited to a boost switching DC-to-DC converter and includes any step up DC-to-DC converter where the circuit parasitic resistances impact the output voltage as the load current causes the duty cycle to increase to the level that it is approaching 100%

While this disclosure has been particularly shown and described with reference to the preferred embodiments thereof, it will be understood by those skilled in the art that various changes in form and details may be made without departing from the spirit and scope of the disclosure.

What is claimed is:
1. An adaptive duty cycle limiting circuit for use with a switching DC-to-DC converter comprising:
   a ramp generator configured for receiving an output voltage of the switching DC-to-DC converter communicated from an output terminal of the switching DC-to-DC converter and configured for generating an out- put ramp signal created from the output voltage of the switching DC-to-DC converter;
a variable voltage source configured for receiving an adjusting voltage level indicating the voltage level of an input voltage source and configured for generating an output voltage level that is a fractional value of the voltage level of the input voltage source; and
a comparator circuit configured for receiving the output voltage level of the variable voltage source, and the output voltage ramp signal, and configured for determining if the voltage level of the variable voltage source is less than or greater than output voltage ramp signal to generate a duty cycle limit signal for transfer to a converter switching control circuit to adjust the duty cycle of the switching DC-to-DC converter.

2. The adaptive duty cycle limiting circuit of claim 1 wherein the converter switching control circuit has an logical OR circuit that is configured to receive the duty cycle limit signal and configured to logically combine it with a feedback duty cycle signal for deactivating a switching circuit of the switching DC-to-DC converter.

3. The adaptive duty cycle limiting circuit of claim 1 wherein the switching DC-to-DC converter is a step-up switching DC-to-DC converter.

4. The adaptive duty cycle limiting circuit of claim 3 wherein the step-up switching DC-to-DC converter is a boost switching DC-to-DC converter.

5. The adaptive duty cycle limiting circuit of claim 3 wherein the step-up switching DC-to-DC converter is a buck-boost switching DC-to-DC converter.

6. The adaptive duty cycle limiting circuit of claim 1 wherein the fractional value of the voltage level of the input voltage source is approximately one-half.

7. An adaptive duty cycle limiting circuit for use with a switching DC-to-DC converter comprising:
a ramp generator configured for receiving a reference voltage from a reference voltage source and configured for generating an output ramp signal created from the reference voltage source;
a variable voltage source configured for receiving an adjusting voltage indicating the voltage level of an input voltage source and configured for generating an output voltage that is a fractional value of the voltage level of the input voltage source from the adjusting voltage; and
a comparator circuit configured for receiving the output voltage of the variable voltage source and the output voltage ramp signal and configured for determining if the voltage level of the variable voltage source is less than or greater than output voltage ramp signal to generate a duty cycle limit signal for transfer to a converter switching control circuit to adjust the duty cycle of the switching DC-to-DC converter.

8. The adaptive duty cycle limiting circuit of claim 7 wherein the converter switching control circuit has an logical OR circuit that is configured to receive the duty cycle limit signal and configured to logically combine it with a feedback duty cycle signal for deactivating a switching circuit of the switching DC-to-DC converter.

9. The adaptive duty cycle limiting circuit of claim 7 wherein the switching DC-to-DC converter is a step-up switching DC-to-DC converter.

10. The adaptive duty cycle limiting circuit of claim 9 wherein the step-up switching DC-to-DC converter is a boost switching DC-to-DC converter.

11. The adaptive duty cycle limiting circuit of claim 9 wherein the step-up switching DC-to-DC converter is a buck-boost switching DC-to-DC converter.

12. The adaptive duty cycle limiting circuit of claim 7 wherein the fractional value of the voltage level of the input voltage source is approximately one-half multiplied by a feedback division ratio.

13. A switching DC-to-DC converter comprising:
an adaptive duty cycle limiting circuit comprising:
a ramp generator configured for receiving an output voltage of the switching DC-to-DC converter communicated from an output terminal of the switching DC-to-DC converter and configured for generating an output ramp signal created from the output voltage of the switching DC-to-DC converter;
a variable voltage source is configured for receiving an adjusting voltage level indicating the voltage level of an input voltage source and configured for generating an output voltage level that is a fractional value of the voltage level of the input voltage source from the adjusting voltage level; and
a comparator circuit configured for receiving the output voltage level of the variable voltage source and the output voltage ramp signal, and configured for determining if the voltage level of the variable voltage source is less than or greater than output voltage ramp signal to generate a duty cycle limit signal for transfer to a converter switching control circuit to adjust the duty cycle of the switching DC-to-DC converter.

14. The switching DC-to-DC converter of claim 13 wherein the converter switching control circuit has an logical OR circuit that is configured to receive the duty cycle limit signal and configured to logically combine it with a feedback duty cycle signal for deactivating a switching circuit of the switching DC-to-DC converter.

15. The switching DC-to-DC converter of claim 13 wherein the switching DC-to-DC converter is a step-up switching DC-to-DC converter.

16. The switching DC-to-DC converter of claim 15 wherein the step-up switching DC-to-DC converter is a boost switching DC-to-DC converter.

17. The switching DC-to-DC converter of claim 15 wherein the step-up switching DC-to-DC converter is a buck-boost switching DC-to-DC converter.

18. The switching DC-to-DC converter of claim 13 wherein the fractional value of the voltage level of the input voltage source is approximately one-half.

19. The switching DC-to-DC converter of claim 13 wherein the fractional value of the voltage level of the input voltage source is approximately one-half multiplied by a feedback division ratio.

20. A switching DC-to-DC converter comprising:
an adaptive duty cycle limiting circuit comprising:
a ramp generator configured for receiving a reference voltage from a reference voltage source and configured for generating an output ramp signal created from the reference voltage source;
a variable voltage source configured for receiving an adjusting voltage indicating the voltage level of the input voltage source and configured for generating an output voltage that is a fractional value of the voltage of the input voltage source; and
a comparator circuit configured for receiving the output voltage of the variable voltage source and the output ramp signal and configured for determining if the voltage level of the variable voltage source is less than or greater than output voltage ramp signal to generate a duty cycle limit signal for transfer to a converter switching control circuit to adjust the duty cycle of the switching DC-to-DC converter.

21. The switching DC-to-DC converter of claim 20 wherein the switching DC-to-DC converter is a step-up switching DC-to-DC converter.

22. The switching DC-to-DC converter of claim 21 wherein the step-up switching DC-to-DC converter is a boost switching DC-to-DC converter.

23. The switching DC-to-DC converter of claim 21 wherein the step-up switching DC-to-DC converter is a buck-boost switching DC-to-DC converter.

24. The switching DC-to-DC converter of claim 20 wherein the converter switching control circuit has an logical OR circuit that configured to receive the duty cycle limit signal and configured to logically combine it with a feedback duty cycle signal for deactivating a switching circuit of the switching DC-to-DC converter.

25. A method for operating a switching DC-to-DC converter for limiting a duty cycle, comprising the steps of:
generating duty cycle ramp signal;
comparing the duty cycle ramp signal with a fractional value of a voltage level of an input voltage source;
repeating the step of comparing the duty cycle ramp signal with a fractional value of a voltage level of an input voltage source, when the voltage level of the duty cycle ramp signal is greater than the fractional value of the voltage level of the input voltage source; and
activating and communicating a cycle limit signal to a switching control circuit to adjust the duty cycle of the switching DC-to-DC converter, when the voltage level of the duty cycle ramp signal is less than the fractional value of the voltage level of the input voltage source.

26. The method of claim 25 wherein the duty cycle ramp signal has a maximum value the output voltage of the switching DC-to-DC converter.

27. The method of claim 26 wherein the fractional value of the voltage level of the input voltage source is one half.

28. The method of claim 25 wherein the duty cycle ramp signal has a maximum value a reference voltage of the switching DC-to-DC converter.

29. The method of claim 28 wherein the fractional value of the voltage level of the input voltage source is one half multiplied by a feedback division ratio.

30. The method of claim 25 wherein the switching DC-to-DC converter is a step up switching DC-to-DC converter for providing an output voltage that is greater than the input voltage of the switching DC-to-DC converter.

31. The method of claim 25 wherein the step up switching DC-to-DC converter is a buck-boost switching DC-to-DC converter or a boost switching DC-to-DC converter.

32. An apparatus for operating a switching DC-to-DC converter for limiting a duty cycle, comprising:
means for generating duty cycle ramp signal;
means for comparing the duty cycle ramp signal with a fractional value of a voltage level of an input voltage source;
means for repeating the step of comparing the duty cycle ramp signal with a fractional value of a voltage level of an input voltage source, when the voltage level of the duty cycle ramp signal is greater than the fractional value of the voltage level of the input voltage source; and
means for activating and communicating a cycle limit signal to a switching control circuit to adjust the duty cycle of the switching DC-to-DC converter, when the voltage level of the duty cycle ramp signal is less than the fractional value of the voltage level of the input voltage source.

33. The apparatus of claim 32 wherein the duty cycle ramp signal has a maximum value a reference voltage of the switching DC-to-DC converter.

34. The apparatus of claim 32 wherein the duty cycle ramp signal has a maximum value the output voltage of the switching DC-to-DC converter.

35. The apparatus of claim 34 wherein the fractional value of the voltage level of the input voltage source is one half.

36. The apparatus of claim 35 wherein the fractional value of the voltage level of the input voltage source is one half multiplied by a feedback division ratio.

37. The apparatus of claim 32 wherein the switching DC-to-DC converter is a step up switching DC-to-DC converter for providing an output voltage that is greater than the input voltage of the switching DC-to-DC converter.

38. The apparatus of claim 32 wherein the step up switching DC-to-DC converter is a buck-boost switching DC-to-DC converter or a boost switching DC-to-DC converter.

* * * * *